United States Patent [19]

Hanson et al.

[11] Patent Number: 6,026,234

[45] Date of Patent: Feb. 15, 2000

[54] METHOD AND APPARATUS FOR PROFILING INDIRECT PROCEDURE CALLS IN A COMPUTER PROGRAM

[75] Inventors: Scott Patrick Hanson; William Jon Schmidt, both of Rochester, Minn.

[73] Assignee: International Business Machines Corporation, Armonk, N.Y.

[21] Appl. No.: 08/820,757

[22] Filed: Mar. 19, 1997

[51] Int. Cl.[7] .................................. G06F 9/44; G06F 9/45
[52] U.S. Cl. ........................ 395/704; 395/705; 395/708; 395/709
[58] Field of Search .................................. 395/704–705, 395/708–710, 680, 682, 684–685, 589, 569

[56] References Cited

U.S. PATENT DOCUMENTS

| | | | |
|---|---|---|---|
| 4,213,119 | 7/1980 | Ward et al. ........................ | 340/870.02 |
| 4,454,579 | 6/1984 | Pilat et al. ........................... | 712/242 |
| 4,847,755 | 7/1989 | Morrison et al. ...................... | 395/706 |
| 4,914,590 | 4/1990 | Loatman et al. ......................... | 704/8 |
| 4,947,315 | 8/1990 | Sokolow et al. ....................... | 395/705 |
| 5,014,185 | 5/1991 | Saito et al. . | |
| 5,021,945 | 6/1991 | Morrison et al. ...................... | 395/706 |
| 5,113,496 | 5/1992 | McCalley et al. ..................... | 710/126 |
| 5,179,703 | 1/1993 | Evans .................................. | 395/703 |
| 5,193,180 | 3/1993 | Hastings .............................. | 395/710 |
| 5,212,794 | 5/1993 | Pettis et al. .......................... | 395/709 |
| 5,237,691 | 8/1993 | Robinson et al. ..................... | 395/703 |
| 5,265,254 | 11/1993 | Blasciak et al. ...................... | 395/704 |
| 5,333,304 | 7/1994 | Christensen et al. ................... | 714/25 |
| 5,335,344 | 8/1994 | Hastings ............................... | 714/35 |
| 5,355,487 | 10/1994 | Keller et al. .......................... | 395/704 |
| 5,412,799 | 5/1995 | Papadopoulos .................... | 395/500.43 |
| 5,428,782 | 6/1995 | White ................................... | 709/101 |
| 5,450,586 | 9/1995 | Kuzara et al. ........................ | 395/704 |
| 5,465,258 | 11/1995 | Adams ................................ | 395/704 |

(List continued on next page.)

OTHER PUBLICATIONS

Balasa, F., et al., "Transformation of Nested Loops with Modulo Indexing to Affine Recurrences", *Parallel Processing Letters*, vol. 4, No. 3 (Sep. 1994), pp. 271–280.

Conte, T.M., et al., "Hardware–Based Profiling: An Effective Technique for Profile–Driven Optimization", *International Journal of Parallel Programming*, vol. 24, No. 2., Apr. 1996, pp. 187–206.

Conte, T.M., et al., "Using Branch Handling Hardware to Support Profile–Driven Optimization", International Symposium on Microarchitecture, 27th, Nov. 30–Dec. 2, 1994, pp. 12–21.

(List continued on next page.)

*Primary Examiner*—James P. Trammell
*Assistant Examiner*—Cuong H. Nguyen
*Attorney, Agent, or Firm*—Martin & Associates, L.L.C.; Derek P. Martin

[57] ABSTRACT

An apparatus and method provide more complete profile data by instrumenting indirect procedure calls in a computer program. Indirect procedure calls have a number of counters allocated in a table at each indirect call site. The counters are divided into counters in a low volatility area and counters in a high volatility area. The counters in the high volatility area have a pointer that identifies the next procedure to be replaced. As the instrumented code executes, a call to a procedure that is in the table increments the count of the counter in the table. A call to a procedure not in the table is placed in the high volatility area, displacing the procedure at the pointer, and moves the pointer to a new location. The displaced procedure is either promoted to the low volatility area, or is discarded. If promoted, the procedure that it displaces in the low volatility area is demoted to the high volatility area, displacing a procedure there at the pointer (and moving the pointer to a new location). This process continues until a displaced high volatility procedure is discarded.

27 Claims, 4 Drawing Sheets

U.S. PATENT DOCUMENTS

| | | | |
|---|---|---|---|
| 5,475,819 | 12/1995 | Miller et al. | 709/203 |
| 5,487,172 | 1/1996 | Hyatt | 712/32 |
| 5,504,901 | 4/1996 | Peterson | 395/708 |
| 5,517,628 | 5/1996 | Morrison et al. | 712/234 |
| 5,522,036 | 5/1996 | Shapiro | 714/38 |
| 5,535,329 | 7/1996 | Hastings | 714/35 |
| 5,539,907 | 7/1996 | Srivastava et al. | 395/705 |
| 5,579,520 | 11/1996 | Bennett | 395/704 |
| 5,602,732 | 2/1997 | Nichols et al. | 701/29 |
| 5,613,118 | 3/1997 | Heisch et al. | 395/709 |
| 5,740,443 | 4/1998 | Carini | 395/705 |
| 5,768,592 | 6/1998 | Chang | 395/704 |
| 5,784,554 | 7/1998 | Hsiung | 714/45 |
| 5,805,821 | 9/1998 | Saxena et al. | 709/231 |
| 5,809,450 | 9/1998 | Chrysos et al. | 702/186 |
| 5,872,810 | 2/1999 | Philips et al. | 375/222 |

OTHER PUBLICATIONS

Kishon, A., et al., "Semantics Directed Program Execution Monitoring", *J. Functional Programming,* vol. 5, No. 4, Oct. 1995, pp. 501–547.

Pettis and Hansen, "Profile Guarded Code Positioning", *Proceedings of the ACM SIGPLAN '90 Conference on Programming Language Design and Implementation,* Jun. 20–22, 1990, pp. 16–27.

"Program Restructuring Technique for Improving Memory Management Performance", *IBM Technical Disclosure Bulletin,* vol. 39, No. 03, Mar. 1996, pp. 203–205.

Schmidt, W., et al., "Profile–Directed Restructuring of Operating System Code$_1$", *Restructuring of Operating System Code,* Jan. 7, 1997, pp. 1–9.

Speer, S.E., et al., "Improving UNIX Kernel Performance using Profile Based Optimization", *1994 Winter USENIX,* Jan. 17–21, 1994, pp. 181–188.

"Statistics Gathering and Analyzing Tool for Open Software Foundation's Distributed Computing Environment", *IBM Technical Disclosure Bulletin,* vol. 37, No. 02B, Feb. 1994, pp. 215–217.

Youfeng, W, et al., "Static Branch Frequency and Program Profile Analysis", *International Symposium on Microarchitecture,* 27th, Nov. 30–Dec. 2, 1994, pp. 1–11.

METHOD AND APPARATUS FOR PROFILING INDIRECT PROCEDURE CALLS IN A COMPUTER PROGRAM

RELATED APPLICATIONS

This application is related to the following co-pending patent application: "Method And Apparatus For Reordering Procedures in a Computer Program Based on Profile Data" Ser. No., 08/820,735, filed Mar. 19, 1997.

BACKGROUND OF THE INVENTION

1. Technical Field

This invention generally relates to computer systems. More specifically, this invention relates to a method and apparatus for collecting profile data for a computer program.

2. Background Art

The development of the EDVAC computer system in 1948 is generally considered the beginning of the computer era. Since that time, dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers and linkers take the human-readable form of a computer program, known as "source code", and convert it into "machine code" or "object code" instructions that may be executed by a computer system. Because a compiler and its associated linker generate the stream of machine code instructions that are eventually executed on a computer system, the manner in which the compiler and linker package procedures within a module affects the performance of the computer program.

In particular, the ordering of procedures within a module affects the performance of the memory paging system in a computer system. Nearly all computer systems have an auxiliary storage, such as a hard disk drive, that has large storage capacity, and is relatively inexpensive yet slow compared to main memory. Main memory is typically comprised of Random Access Memory (RAM), which has a much smaller storage capacity and is more expensive than primary storage, yet it is very fast. Instructions and data are typically moved between primary storage and main memory in "pages." A "page" consists of a predefined number of bytes (typically a power of two), and is the fundamental unit of transfer between primary storage and main memory. A predetermined number of pages are typically set aside in main memory for storing pages as they are moved between auxiliary storage and main memory. When a processor within a computer system begins executing a computer program, the memory paging system fills the portion of main memory allocated to paging with pages from primary storage. When the processor needs data that is not in any of the pages in main memory, the memory paging system selects one or more pages that are replaced by new pages from primary storage. Swapping pages in and out of memory requires time and system resources, and therefore degrades system performance. In other words, the fewer the number of page swaps, the better.

Many modern software development environments include a profiling mechanism that uses information collected about a program's run-time behavior (known as profile data) to improve optimization of that program. "Profile data" as used herein means any estimates of execution frequencies in a computer program. Using profile data, a compiler, a linker, or a separate optimizer program may make decisions during the compilation and/or linking of a computer program regarding the preferred order of procedures within the computer program in order to optimize the performance of the computer system.

Profile data may be generated in a number of different ways. One way of generating profile data is to perform a static analysis of the program code to estimate the execution frequencies of procedures in the computer program. Other methods are known that dynamically collect information about a computer program as it runs.

One type of dynamic profiler is known as an instrumenting profiler. An instrumenting profiler inserts special instrumentation code known as "hooks" at important points in the computer program (such as procedure calls). An instrumenting profiler generally defines a counter for each program event of interest, and the instrumentation hooks increment their corresponding counters. As the instrumented program executes, these hooks cause data counters to be incremented, recording the profile history directly. When the sample run of the computer program is complete, the counters contain profile data. In the case of procedure reordering, the profile data of interest is the number of times each procedure is called by other procedures in the computer program.

Procedures may generally be called in two different ways. Direct procedure calls invoke a procedure using its name. Indirect procedure calls invoke a procedure using a variable, index, procedure pointer, or other indirect method that makes it impossible for a profiler to tell which procedure will be called when it is inserting instrumentation hooks into the computer program. Instrumenting direct procedure calls is straightforward. A counter is allocated for each direct procedure call within a selected procedure, and the instrumentation hook at a direct call site within the selected procedure simply increments the counter corresponding to the procedure called. Instrumenting indirect procedure calls, however, is a complex problem that known prior art solutions do not adequately address. Most prior art profilers simply ignore indirect call sites, thereby losing important profile data. Without improved apparatus and methods for collecting profile data at indirect call sites, the profile data will lack important information relating to indirect procedure calls, and the computer industry will never fully realize the benefits of profiling.

DISCLOSURE OF INVENTION

According to the preferred embodiments disclosed herein, an apparatus and method provide more complete profile data by instrumenting indirect procedure calls in a computer program. Indirect procedure calls have a number of counters allocated in a table at each indirect call site. The counters are divided into counters in a low volatility area and counters in a high volatility area. The counters in the high volatility area have a pointer that identifies the next procedure to be replaced. As the instrumented code executes, a call to a procedure that is in the table increments the count of the counter in the table. A call to a procedure not in the table is placed in the high volatility area, displacing the procedure at the pointer, and moves the pointer to a new location. The displaced procedure is either promoted to the low volatility area, or is discarded. If promoted, the procedure that it displaces in the low volatility area is demoted to the high volatility area, displacing a procedure there at the pointer (and moving the pointer to a new location). This process continues until a displaced high volatility procedure is discarded.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
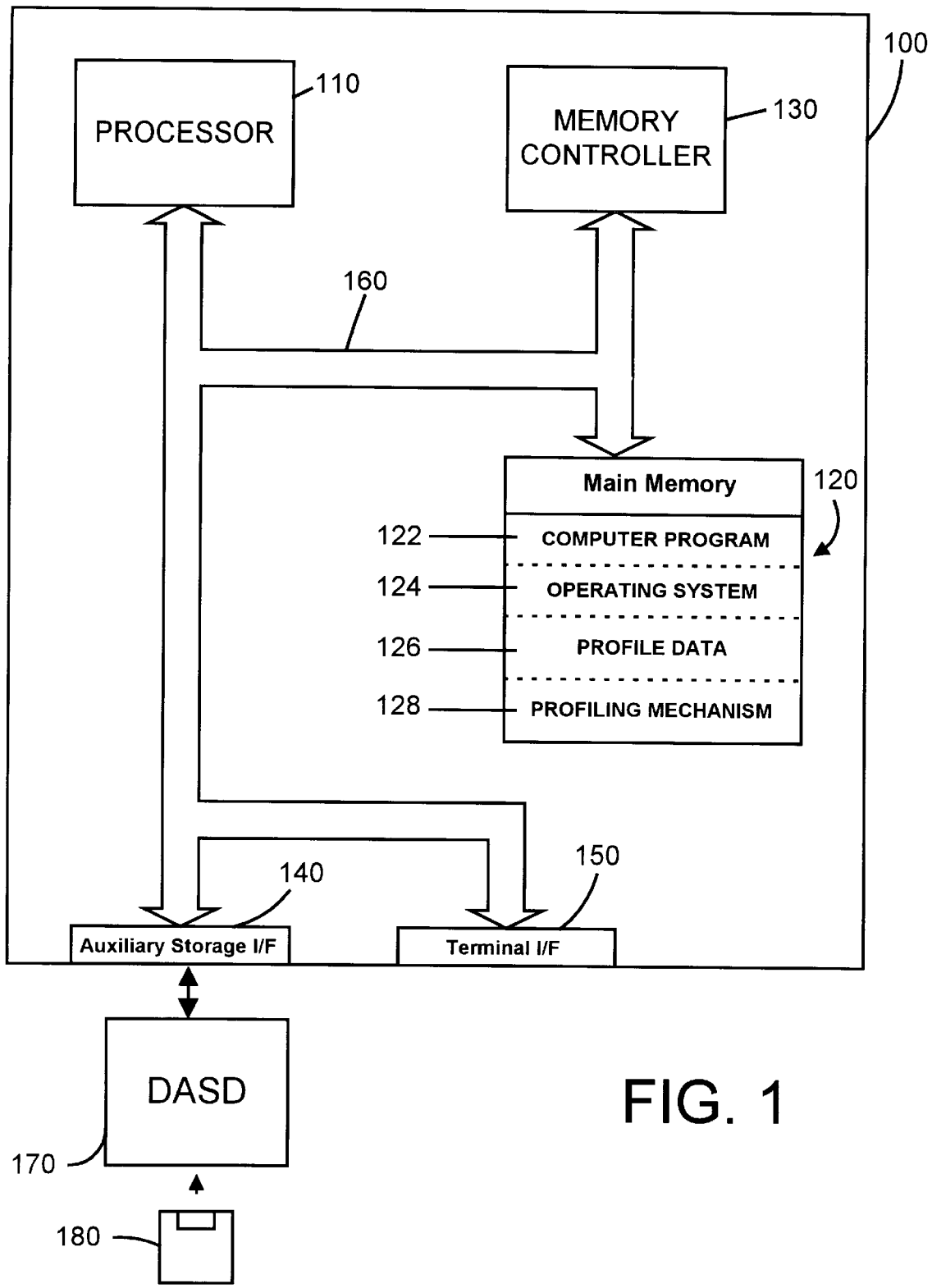
FIG. 1 is a block diagram of a computer apparatus in accordance with the present invention.

The present invention relates to the generation of profile data for a computer program so the computer program may be optimized according to the profile data. For those that are not experts in the field, the Overview section below provides general background information that will be helpful in understanding the concepts of the invention.

OVERVIEW

Procedure Reordering Modern compilers typically group instructions into groups known as "basic blocks". The term "basic block" is well known in the art, and represents a maximal sequence of straight-line code. A procedure in a computer program typically includes many basic blocks. A module, or compilation unit, in a computer program includes one or more procedures that are compiled at the same time. The computer program is defined by a hierarchy of modules, procedures, and basic blocks. Once the computer program is defined by a particular hierarchy, certain profile-based optimizations may be performed to enhance the performance of the computer program.

One important profile-based optimization is procedure reordering, which analyzes the most frequently executed paths among procedures in a computer program, and uses this information to reorder the procedures within the module or computer program of interest. The primary purpose of this reordering is to improve memory paging performance.

The performance of the memory paging system depends on the ordering of procedures, as illustrated by the extremely simplified example below. Procedure A, which has 500 bytes, is initially packaged at the beginning of the module. Procedure B, which has 1200 bytes, is initially packaged at the end of the module. There are numerous procedures in between A and B that have a total of 15,000 bytes. Assume the page size is 1,000 bytes and that the memory paging system brings in two pages at a time and can store a total of ten pages. Assume that A is aligned at the first byte of the module, and that other procedures have been executed prior to A (to assure the memory paging system has filled all of the pages). When the memory paging system sees that the processor needs to access A, it will swap the two pages already in memory for the two pages that include procedure A. These two pages include procedure A and 1,500 bytes of other procedures. When the processor has finished executing A, assume that B needs to be executed, but B is not in memory. The memory paging system must bring in the pages that contain procedure B. Note that procedure B may occupy two or three pages depending on where the page boundaries fall. For example, if B has its first 100 bytes on one page, its next 1000 bytes on a second page, and its last 100 bytes on a third page, it would span three pages. If procedure B spans three pages, the memory paging system would have to bring in four pages into the main memory, since it brings in two pages at a time. In this example, the initial packing order of A and B results in the memory paging system performing a total of six page swaps to execute A and B. Note, however, that if B were packaged immediately after A, both A and B (total of 1,700 bytes) would be brought in with the first two page swaps to bring in A, reducing the number of page swaps from six to two. This example illustrates how the packaging order of procedures in a computer program can affect performance of the computer system.

Problems in Instrumenting Indirect Procedure Calls

Known instrumenting profilers simply ignore indirect procedure calls because the prior art offers no good way of collecting meaningful profile data regarding the execution frequencies of procedures at indirect call sites. One possible way would allocate a number of counters to each indirect call site that is larger than the greatest anticipated number of potential called procedures (hereinafter "callees"). One problem is that the number of potential callees may be very large in a complex computer program such as an operating system. Another problem is that the number of indirect call sites may be very large as well. For example, if the number of potential callees is 10,000, and the number of indirect call sites is 100,000, the profiler would have to allocate 10,000 counters at each of the 100,000 indirect call sites, for a total of 1,000,000,000 counters. This is an excessive number of counters to allocate to memory, particularly when the vast majority of these counters would likely go unused.

One possible solution that would require fewer counters would allocate a fixed number N of counters for each indirect call site, and allocate these counters to the first N callees encountered. This type of a table is known as a first-N frequency table. But this is still not a good solution. If there are more than N potential callees, there is no guarantee that the most frequently called procedures will be among the first N encountered. Furthermore, if there are less than N callees, the remaining counters go unused and waste memory resources.

Because the prior art offers no effective and economical solutions for accurately obtaining profile data at indirect call sites, most known instrumenting profilers do not instrument indirect call sites. If the number of indirect call sites is large, the information that is not gathered would likely affect the ordering of procedures within the computer program. For this reason, a more accurate and economical way of gathering profile data at indirect call sites is needed to assure the most optimal ordering of procedures within a computer program.

DETAILED DESCRIPTION

As discussed in the Background section, the generation of profile data for direct procedure calls is relatively straightforward. However, the generation of profile data for indirect procedure calls is problematic, and presents challenges that have not been successfully overcome in the prior art. The present invention provides an apparatus and method for collecting profile data at indirect call sites within a computer program. By taking into account profiling data at indirect call sites, the ordering of procedures in a computer program will be improved, thereby enhancing the performance of the computer program.

Referring to FIG. 1, a computer system 100 in accordance with the present invention is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

Processor 110 performs computation and control functions of computer system 100, and comprises a suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes a computer program 122 within main memory 120.

Auxiliary storage interface 140 is used to allow computer system 100 to store and retrieve information from auxiliary storage, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. Note that an optimizer in accordance with the present invention may exist as a program product on one or more floppy disks 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media employed to actually carry out the distribution. Examples of signal bearing media include: recordable type media such as floppy disks (e.g., disk 180) and CD ROMS, and transmission type media such as digital and analog communication links.

Memory controller 130, through use of a processor separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bidirectional communication could be used.

Main memory 120 contains one or more computer programs 122, an operating system 124, profile data 126, and a profiling mechanism 128 for generating the profile data. Profiling mechanism 128 inserts instrumentation code into computer program 122, and collects profile data 126 while processor 110 executes computer program 122. The term "computer program" is used herein in its broadest sense, and includes any and all forms of computer programs, including source code, intermediate code, machine code, and any other representation of a computer program that has procedures that could be called.

It should be understood that main memory 120 will not necessarily contain all parts of all mechanisms shown. For example, portions of computer program 122, operating system 124, and profiling mechanism 128 may be loaded into an instruction cache (not shown) for processor 110 to execute, while other files may well be stored on magnetic or optical disk storage devices (not shown). Those skilled in the art will appreciate that the present invention applies equally to any computer program 122 that has procedures or the equivalent of procedures, including: functions, methods in an object-oriented programming environment, etc.

Figure 2:
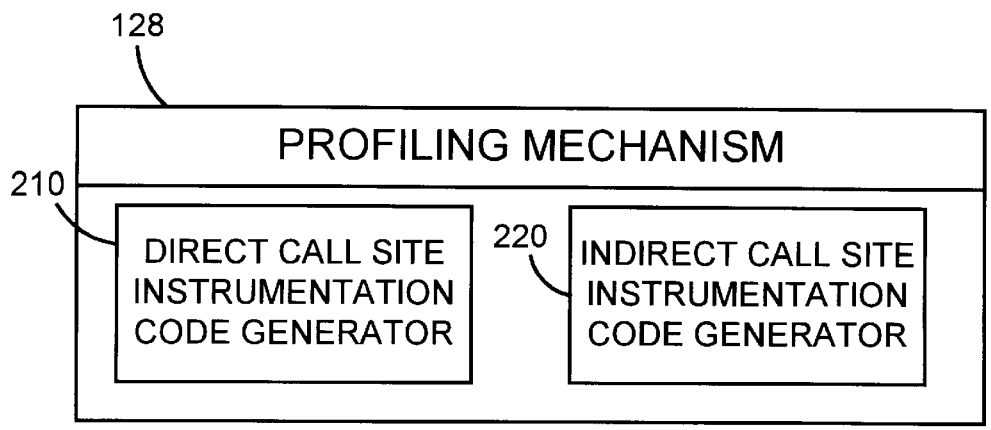
FIG. 2 is a block diagram of the profiling mechanism of FIG. 1.

Referring to FIG. 2, profiling mechanism 128 includes a direct call site instrumentation code generator 210 and an indirect call site instrumentation code generator 220. Direct call site instrumentation generator 210 suitably generates instrumentation code for direct call sites according to known methods. According to one such method, direct call site instrumentation generator 210 allocates a counter for each procedure that is directly called, and generates code that it inserts into computer program 122 that causes the counter for a procedure to be incremented each time the procedure is called.

Indirect call site instrumentation code generator 220 generates instrumentation code for indirect call sites in accordance with the teachings of the present invention. A predetermined number of counters are allocated to each indirect call site, rather than a single counter. The number of counters may be any suitable number to obtain the desired performance. In the preferred embodiment, the number of counters is suitably from four to twenty, is preferably from eight to twelve, and is most preferably ten. By allocating ten counters for each indirect call site, and by collecting profile data at these indirect call sites using these counters, the procedures that are most often called at each indirect call site may be determined.

Figure 3:
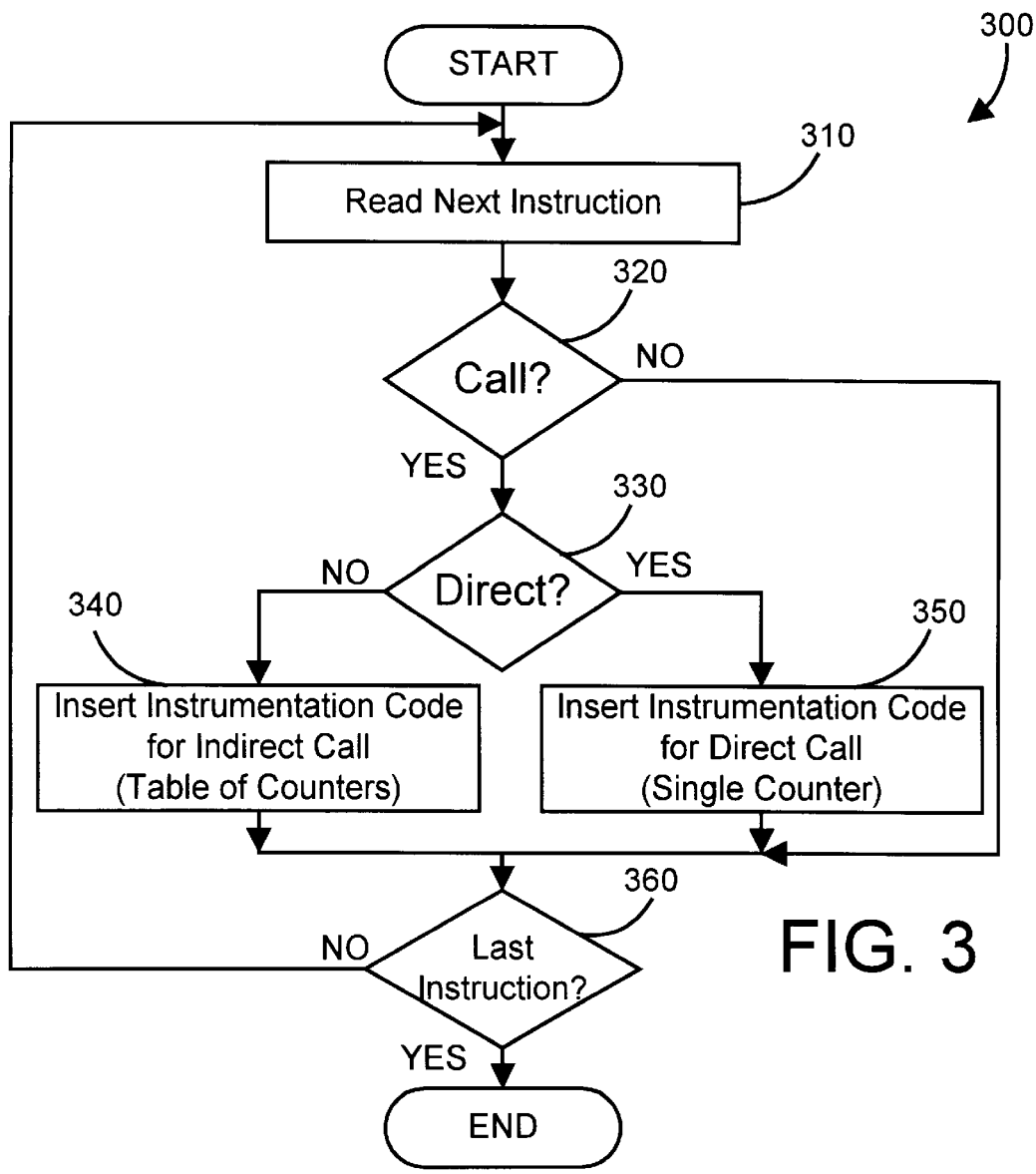
FIG. 3 is a flow diagram of a method for inserting instrumentation code into a computer program in accordance with the present invention.
Figure 4:
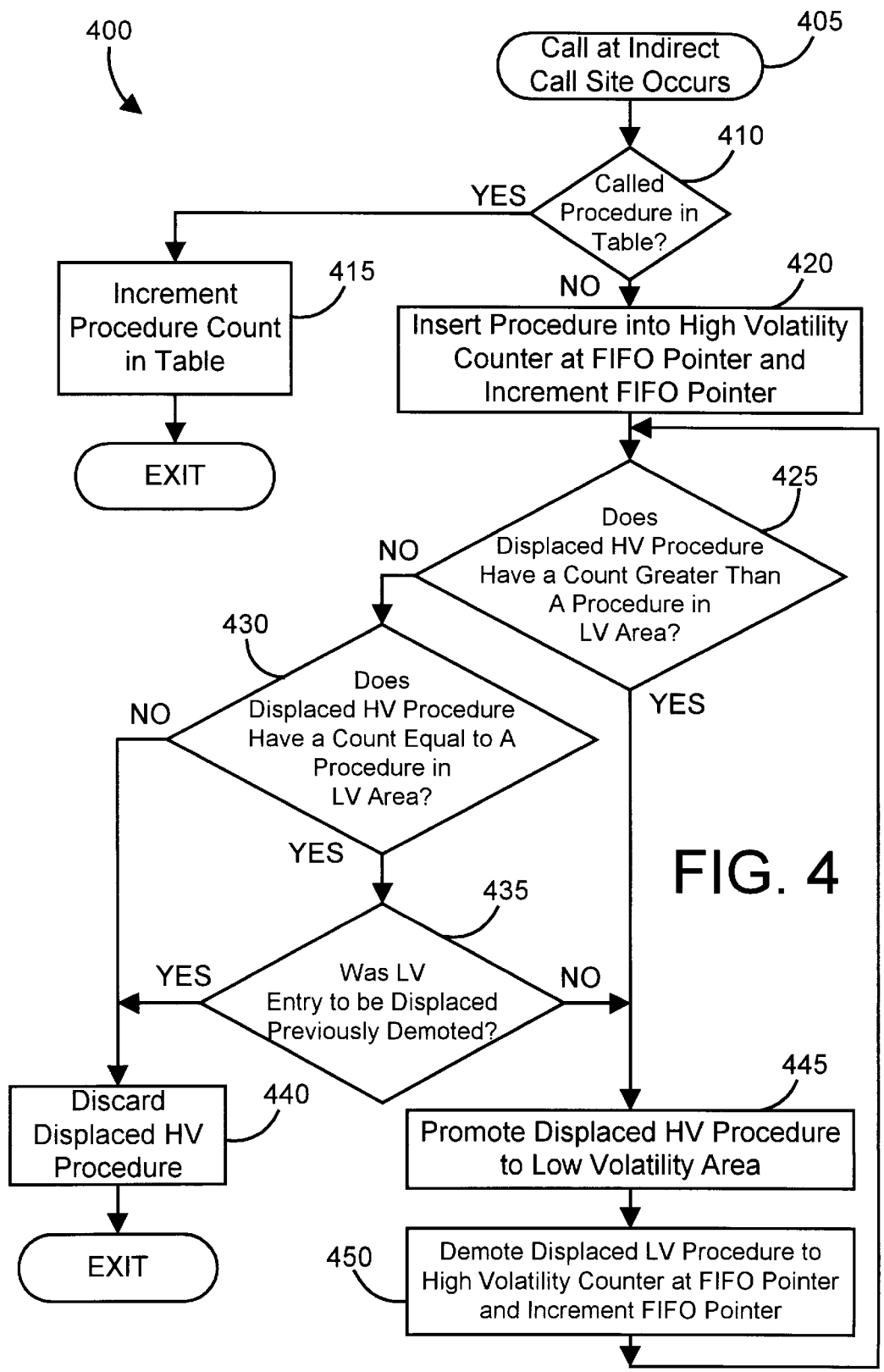
FIG. 4 is a flow diagram of a method for collecting profile data at indirect call sites in accordance with the present invention.

Referring to FIG. 3, a method 300 is shown for generating instrumentation code for a computer program. Method 300 is suitably implemented within an instrumenting profiler, such as profiling mechanism 128, to generate instrumentation code to monitor procedure calls in a computer program (such as computer program 122). Method 300 begins by reading an instruction (step 310). The only instructions that method 300 is interested in are procedure calls. If the instruction is not a procedure call (step 320=NO), method 300 checks to see if it's the last instruction (step 360), and if not (step 360=NO), method 300 loops back to read the next instruction (step 310). If the instruction is a procedure call (step 320=YES), step 330 determines whether the call is a direct procedure call or an indirect procedure call. If the procedure call is a direct procedure call (step 330=YES), method 300 inserts instrumentation code for a direct procedure call (step 350). Direct call site instrumentation code generator 210 of FIG. 2 assures that a single counter is allocated to the procedure being called and generates appropriate instrumentation code for each direct call site, which increments the counter at the procedure call. If the procedure call is an indirect procedure call (step 330=NO), method 300 inserts instrumentation code for the indirect call (step 340). Indirect call site instrumentation code generator 220 of FIG. 2 allocates a predetermined number of counters to each indirect call site, and generates the appropriate instrumentation code for each indirect call site, which handle these counters in accordance with a method 400 that is discussed below with reference to FIG. 4. For this specific example, we assume that method 300 allocates ten counters for each indirect call site. If there are still instructions remaining (step 360=NO), method 300 loops back to the next instruction (step 310), and this process continues until all instructions in the computer program 122 have been read (step 360=YES). At this point, method 300 ends, having inserted instrumentation code for all direct and indirect call sites within computer program 122.

Figure 5:
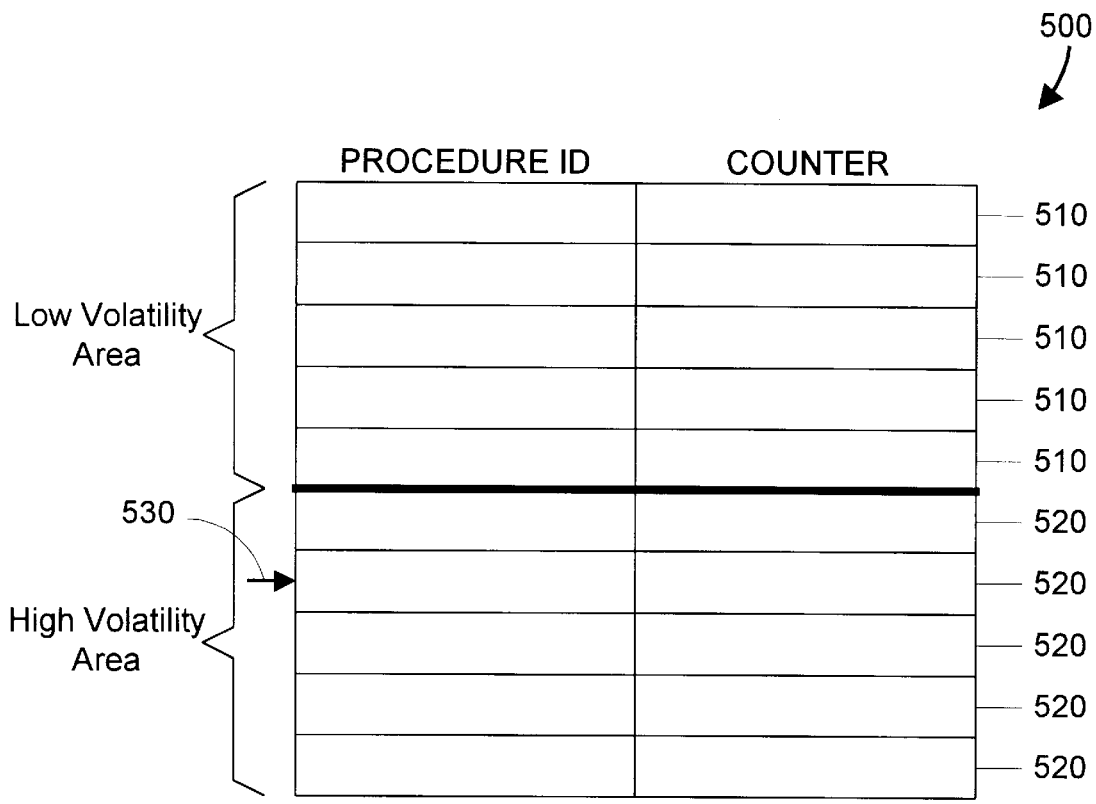
FIG. 5 is a schematic diagram showing the configuration and grouping of counters within the counter table referred to in the method of FIG. 4.

The counters allocated to each indirect call site in method 300 are suitably divided up into high volatility counters and low volatility counters, as shown in FIG. 5. Each counter contains one field (Procedure ID) that identifies the called procedure, and a second field (Counter) that contains the count of the number of times the procedure was called at the indirect call site that corresponds to this group of counters. The counters for a particular indirect call site may be conceptually thought of as a table 500 of individual counters, with the counters 510 in one part of the table being low volatility counters, and the counters 520 in the other part of the table being high volatility counters. Table 500 also includes a pointer 530 that is used to point to one of the high volatility counters. Pointer 530 is incremented in first-in-first-out (FIFO) fashion so that once a high volatility counter 520 is written, pointer 530 is incremented to point to the next high volatility counter 520. Pointer 530 thus progresses from one high volatility counter 520 to the next in a loop, incrementing each time a high volatility counter 520 is updated.

Once method 300 has properly instrumented all procedure calls within a computer program 122, the computer program 122 is executed, and counters are used to collect profile data as the computer program 122 runs. The instrumentation code at each direct call site simply increments a counter corresponding to the called procedure. The instrumentation code at each indirect call site, however, must perform manipulations on the counters corresponding to the call site. These manipulations are described as method 400 of FIG. 4. Method 400 of FIG. 4 refers to the group of high volatility counters 520 collectively as the high volatility area of table 500, and refers to the group of low volatility counters 510 collectively as the low volatility area of table 500.

Method 400 is invoked when a call at an indirect call site occurs (step 405) during the execution of the instrumented computer program 122. When a call at an indirect call site occurs, method 400 looks at the table 500 of counters that correspond to the specific indirect call site. If the indirect call site calls a procedure that is already in the table 500 of counters (step 410=YES), the count corresponding to that procedure is incremented in the appropriate counter (step 415), and method 400 exits. If, however, the called procedure is not in the table 500 of counters (step 410=NO), the called procedure is inserted into a high volatility counter 520 that is pointed to by pointer 530, thereby displacing a high volatility procedure (step 420). The newly added high volatility procedure has a count of one. By placing a procedure into the high volatility area of table 500, pointer 530 is incremented to point to the next high volatility counter 520. Note that when pointer 530 is in the last position of the high volatility area, incrementing pointer 530 makes pointer 530 point to the first position of the high volatility area. Method 400 must next determine what to do with the displaced procedure. If the displaced procedure has a count less than the count of all procedures in the low volatility area (step 425=NO and step 430=NO), the displaced high volatility procedure is discarded (step 440). If the displaced high volatility procedure has a count greater than a procedure in the low volatility area of table 500 (step 425=YES), the displaced procedure is promoted to the low volatility area, displacing a low volatility procedure with lesser count (step 445). The displaced low volatility procedure is then demoted to the high volatility area, displacing a high volatility procedure at pointer 530, and incrementing pointer 530 (step 450). Now we have another displaced high volatility procedure that we must determine what to do with. This process continues until the high volatility procedure is discarded (step 440), at which point method 400 exits.

Note that if the displaced high volatility procedure is equal to the procedure in the low volatility area that has the lowest count (step 425=NO and step 430=YES), we must determine whether the low volatility counter to be displaced was previously demoted (step 435). If so (step 435=YES), the displaced high volatility procedure is discarded (step 440). If the low volatility counter to be displaced was not previously demoted (step 435=NO), the displaced high volatility procedure is promoted (step 445) as described above. Steps 430 and 435 are present to assure an exit condition for method 400. If, for example, all procedures in the high volatility have the same count, which is the same count as the lowest count procedure in the low volatility area, method 400 needs a way to know that the low volatility counter to be displaced was already demoted by a high volatility procedure of the same count.

Figure 6:
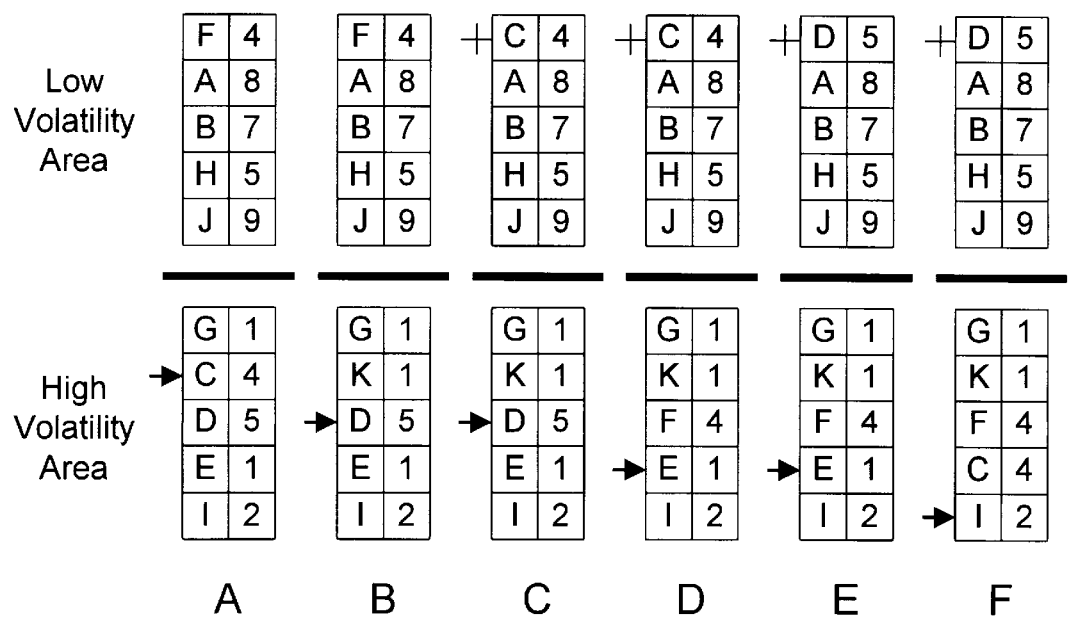
FIG. 6 is a schematic diagram of a sample counter table of FIG. 5 illustrating the operation of the method of FIG. 4.

An example will now illustrate the operation of method 400 for the table of FIG. 6, column A. This table in column A represents a table 500 of counters that have a procedure ID field and a count field. In FIG. 6, the procedure ID field is occupied by a letter identifying the procedure, and the count field is identified by a number indicating the number of times that procedure has been called at this indirect call site. For example, the first entry in the low volatility area is F4, which means that procedure F has been called four times at this indirect call site. In the next entry, A has been called eight times at this indirect call site, and so on.

We assume that the table of counters is initially filled with the first ten unique procedures to be called, by either simply filling up the ten entries sequentially with the first ten procedures called, or by initializing the table to represent no procedures and no counts, and applying method 400 to each of the first ten procedures called. Once the first ten procedures have been added to the table, all subsequent procedure calls at this indirect call site are processed in accordance with method 400. Column A represents the table of counters in a steady state (i.e., at some point after the table has been filled). Pointer 530 in this steady state is assumed to point to the high volatility counter that contains C4.

Next, we see what happens when a new procedure K is called at this indirect call site (step 405). Since it does not have an entry in the table (step 410=NO), K is inserted into the high volatility counter identified by pointer 530, and pointer 530 is incremented to the next position (step 420), as shown in column B. Thus, procedure K with a count of one displaces C4 in the high volatility area. Now we must determine what to do with C4, the displaced high volatility procedure. C4 has a count of four, which is equal to the smallest count in the low volatility area (F4) (step 425=NO and step 430=YES). F4 was not previously demoted during this pass of method 400 (step 435=NO), so C4 is promoted, and displaces low volatility procedure F4 (step 445), as shown in column C. F4 is then demoted from the low volatility area and put into the high volatility area at the position of pointer 530, displacing high volatility procedure D5 (step 450), as shown in column D. The fact that the counter that holds C4 was previously demoted (when C4 displaces F4) is noted by the plus sign next to the C4 counter in column C. Pointer 530 is incremented to its next position during step 450. Now we must determine what to do with this displaced procedure, D5. D5 has a count greater than the count of C4 (step 425=YES), so D5 is promoted to the low volatility area (step 445), as shown in column E. C4 is demoted to the high volatility area (step 450) at the location of pointer 530, and pointer 530 is incremented to its next position (step 450). C4 thus displaces E1, as shown in column F.

E1 has a count of one, which is less than any procedure in the low volatility area (step 425=NO and step 430=NO), so E1 is discarded, and the table is left in the state shown in column F for the next procedure that is called at this indirect call site.

When the computer program has been run for the desired sample run for the purpose of generating profile data, table 500 may be used to tell which procedures were called at this site most frequently. In particular, the two or three most frequently called procedures in the low volatility area contain the most meaningful information, which can then be used as profile data to determine the order of procedures in the computer program.

The apparatus and methods in accordance with the present invention disclosed herein provide a way to generate profile data for indirect procedure calls in a computer program without allocating a large number of counters for each indirect call site. By profiling indirect procedure calls as well as direct procedure calls, better optimization is possible through procedure reordering.

While the invention has been particularly shown and described with reference to preferred embodiments thereof, it will be understood by those skilled in the art that various changes in form and details may be made therein without departing from the spirit and scope of the invention.

We claim:

1. An apparatus comprising:
    at least one processor;
    a memory coupled to the at least one processor;
    a computer program residing in the memory comprising a plurality of procedures;
    a profiling mechanism residing in the memory and executed by the at least one processor, the profiling mechanism determining which of the plurality of procedures are most frequently called at a plurality of indirect call sites in the computer program during execution of the computer program using a plurality of counters corresponding to each indirect call site.

2. The apparatus of claim 1 wherein the profiling mechanism includes an indirect call site instrumentation code generator for setting aside a plurality of counters at each of the plurality of indirect call sites.

3. The apparatus of claim 1 wherein each of the plurality of counters identifies a called procedure and a count for the called procedure.

4. The apparatus of claim 1 wherein the plurality of counters comprises a plurality of high volatility counters and a plurality of low volatility counters.

5. The apparatus of claim 4 wherein the profiling mechanism displaces a procedure stored in one of the plurality of high volatility counters when a procedure is called at the indirect call site corresponding to the plurality of counters, the profiling mechanism promoting the displaced procedure to one of the plurality of low volatility counters if the displaced procedure satisfies predetermined promotion criteria.

6. The apparatus of claim 5 wherein the profiling mechanism discards the displaced procedure if it does not satisfy the predetermined promotion criteria.

7. The apparatus of claim 5 wherein the profiling mechanism demotes the procedure displaced by the promoted procedure to one of the plurality of high volatility counters.

8. An apparatus comprising:
    at least one processor;
    a memory coupled to the at least one processor;
    an instrumented computer program residing in the memory, the instrumented computer program comprising a plurality of procedures, the instrumented computer program further comprising a plurality of counters corresponding to each of a plurality of indirect call sites, the plurality of counters determining which of the plurality of procedures are most frequently called at the plurality of indirect call sites during execution of the instrumented computer program.

9. The apparatus of claim 8 wherein the plurality of counters comprises a plurality of high volatility counters and a plurality of low volatility counters.

10. The apparatus of claim 8 wherein each of the plurality of counters identifies a called procedure and a count for the called procedure.

11. An apparatus comprising:
    at least one processor;
    a memory coupled to the at least one processor;
    a computer program residing in the memory comprising a plurality of procedures;
    a plurality of counters corresponding to each indirect call site in the computer program, the plurality of counters including a plurality of high volatility counters and a plurality of low volatility counters, each of the plurality of counters identifying a called procedure and a count for the called procedure;

a profiling mechanism residing in the memory and executed by the at least one processor, the profiling mechanism determining which of the plurality of procedures are most frequently called at a plurality of indirect call sites in the computer program, the profiling mechanism comprising:
an indirect call site instrumentation code generator for providing the plurality of counters at each indirect call site; and
a pointer pointing to one of the plurality of high volatility counters to form a first-in-first-out (FIFO) buffer in the plurality of high volatility counters.

12. A method of collecting profile data at indirect call sites in a computer program comprising the steps of:
executing a computer program comprising a plurality of procedures;
determining which of the plurality of procedures are most frequently called at a plurality of indirect call sites during the execution of the computer program using a plurality of counters corresponding to each indirect call site.

13. A method for instrumenting a computer program, the computer program including a plurality of procedures, the method comprising the steps of:
allocating a plurality of counters to each of a plurality of indirect call sites in the computer program; and
inserting instrumentation code into the computer program to interact with the plurality of counters according to predetermined criteria that results in the plurality of counters determining which of the plurality of procedures are most frequently called at the plurality of indirect call sites when the instrumented computer program is executed.

14. A method of collecting profile data at indirect call sites in a computer program, the method comprising the steps of:
(A) providing a plurality of high and low volatility counters at each indirect call site;
(B) for each call to a procedure at a selected indirect call site during execution of the computer program, performing the steps of:
(1) determining whether the called procedure is in the plurality of counters corresponding to the selected indirect call site;
(2) if the called procedure is in the plurality of corresponding counters, incrementing the counter corresponding to the called procedure;
(3) if the called procedure is not in the plurality of corresponding counters, performing the steps of:
(a) displacing a high volatility procedure in one of the plurality of high volatility counters with the called procedure;
(b) promoting the displaced high volatility procedure to one of the plurality of low volatility counters if the displaced high volatility procedure satisfies predetermined promotion criteria;
(c) discarding the displaced high volatility procedure if it does not satisfy the predetermined promotion criteria;
(d) demoting any procedure displaced by a promoted procedure to displace a high volatility procedure in one of the plurality of high volatility counters;
(e) repeating steps (b) through (d) until the most recently displaced high volatility procedure is discarded.

15. The method of claim 14 wherein each of the plurality of counters identifies a called procedure and a count for the called procedure.

16. A method of collecting profile data at indirect call sites in a computer program, the method comprising the steps of:
(A) providing a plurality of high and low volatility counters at each indirect call site, each of the plurality of counters identifying a called procedure and a count for the called procedure;
(B) providing a pointer for the plurality of high volatility counters that points to one of the high volatility counters and advances to the next high volatility counter when the pointer is incremented, the pointer pointing to one of the plurality of high volatility counters to form a first-in-first-out (FIFO) buffer in the plurality of high volatility counters;
(C) providing instrumentation code in the computer program at each indirect call site;
(D) executing the computer program;
(E) for each call to a procedure at a selected indirect call site during the execution of the computer program, performing the steps of:
(1) determining whether the called procedure is in the plurality of counters corresponding to the selected indirect call site;
(2) if the called procedure is in the plurality of corresponding counters, incrementing the count of the called procedure;
(3) if the called procedure is not in the plurality of corresponding counters, performing the steps of:
(a) displacing a high volatility procedure in the high volatility counter identified by the pointer;
(b) incrementing the pointer;
(c) promoting the displaced high volatility procedure to one of the plurality of low volatility counters if the displaced high volatility procedure satisfies predetermined promotion criteria;
(d) discarding the displaced high volatility procedure if it does not satisfy the predetermined promotion criteria;
(e) demoting any procedure displaced by a promoted procedure to displace a high volatility procedure the high volatility counter identified by the pointer;
(f) repeating steps (b) through (e) until the most recently displaced high volatility procedure is discarded.

17. The method of claim 16 wherein the predetermined promotion criteria are satisfied if the displaced high volatility procedure has a count greater than the count of one of the procedures in the plurality of low volatility counters.

18. The method of claim 17 wherein the predetermined promotion criteria are further satisfied if the displaced high volatility procedure has a count equal to the count of the procedure with the lowest count in the plurality of low volatility counters and if the procedure with the lowest count in the plurality of low volatility counters was not previously demoted during steps (a) through (f) for a particular call.

19. A program product comprising:
(A) a profiling mechanism that determines which of a plurality of procedures in a computer program are most frequently called at a plurality of indirect call sites in the computer program using a plurality of counters corresponding to each indirect call site; and
(B) computer-readable signal bearing media bearing the profiling mechanism.

20. The program product of claim 19 wherein the computer-readable signal bearing media comprises recordable media.

21. The program product of claim 19 wherein the computer-readable signal bearing media comprises transmission media.

22. The program product of claim 19 wherein the profiling mechanism includes an indirect call site instrumentation code generator for setting aside the plurality of counters at each of the indirect call sites.

23. The program product of claim 19 wherein the plurality of counters comprises a plurality of high volatility counters and a plurality of low volatility counters.

24. The program product of claim 23 wherein the profiling mechanism displaces a procedure stored in one of the plurality of high volatility counters when a procedure that is not represented in the plurality of counters is called at the indirect call site corresponding to the plurality of counters, the profiling mechanism promoting the displaced procedure to one of the plurality of low volatility counters if the displaced procedure satisfies predetermined promotion criteria.

25. The program product of claim 24 wherein the profiling mechanism demotes the procedure displaced by the promoted procedure to one of the plurality of high volatility counters.

26. The program product of claim 23 wherein the profiling mechanism discards the displaced procedure if it does not satisfy the predetermined promotion criteria.

27. A program product comprising:

(A) a profiling mechanism that determines which of a plurality of procedures are most frequently called at a plurality of indirect call sites in a computer program, the profiling mechanism comprising:

(1) an indirect call site instrumentation code generator for providing a plurality of high and low volatility counters at each indirect call site;

(2) a pointer pointing to one of the plurality of high volatility counters to form a first-in-first-out (FIFO) buffer in the plurality of high volatility counters; and (B) computer-readable signal bearing media bearing the profiling mechanism.

* * * * *